United States Patent [19]

Buer

[11] Patent Number: 4,724,363

[45] Date of Patent: Feb. 9, 1988

[54] CURRENT CONTROL CIRCUIT FOR HIGH VOLTAGE APPLICATIONS

[75] Inventor: Richard W. Buer, Cortland, N.Y.

[73] Assignee: General Electric Company, Princeton, N.J.

[21] Appl. No.: 877,902

[22] Filed: Jun. 24, 1986

[51] Int. Cl.[4] .......................... G05F 1/00; H05B 37/02; H05B 39/04; H05B 41/36

[52] U.S. Cl. ........................................ 315/307; 315/94; 315/106; 315/107; 315/209 CD; 315/239; 328/68; 307/33

[58] Field of Search ................. 315/94, 106, 107, 307, 315/308, 297, 209 CD, 239; 328/248, 242, 67, 243, 68; 307/33

[56] References Cited

U.S. PATENT DOCUMENTS

| | | | |
|---|---|---|---|
| 3,315,124 | 4/1967 | Boeker | 315/94 |
| 3,619,717 | 11/1971 | Lee et al. | 315/94 |
| 3,742,242 | 6/1973 | Morio et al. | 307/33 |
| 4,334,195 | 6/1982 | Luce | 328/172 |
| 4,422,016 | 12/1983 | Kurpe | 315/308 |
| 4,591,761 | 5/1986 | Gregorich et al. | 315/209 CD |

Primary Examiner—Saxfield Chatmon
Attorney, Agent, or Firm—Eugene M. Whitacre; Vincent J. Coughlin, Jr.

[57] ABSTRACT

A current control circuit for high voltage applications includes series-connected high and low voltage sources through which the current to be regulated flows. The low voltage source is a capacitor which is periodically recharged through a flyback transformer by a series of constant energy pulses having a very low duty cycle. The peak value of the flyback pulses are detected to provide a "condition signal" which is representative of the state-of-charge on the capacitor and can be used to protectively inhibit operation of the control circuit and can, in a variant of the circuit be used as an error control signal to maintain the current at a constant level. In the preferred embodiment a sensing capacitor is placed in parallel to the pulsed capacitor to detect the fluctuations in potential and form a sense current which is representative of the regulated current and which is used in a feedback loop to form a control signal for maintaining the regulated current constant. One application of the control circuit is the control of the beam current in a light valve.

20 Claims, 7 Drawing Figures

CURRENT CONTROL CIRCUIT FOR HIGH VOLTAGE APPLICATIONS

BACKGROUND OF THE INVENTION

1. Field of the Invention

The invention generally relates to current control circuits, and more particularly to a system for maintaining low magnitude currents, such as beam currents in light valves at a substantially constant value in high voltage applications.

2. Description of the Prior Art

Projection television displays have utilized light valves which are suitable for projecting images onto remote display surfaces. Such light valves have been incorporated in professional large screen color and monochrome television projectors of the type sold by the General Electric Company and described, for example, in General Electric Company Publication No. VDEO-077.

Light valves have been described in the literature, including the following publications: "Projection Color Television Display Using a Single Beam Oil Film Light Valve," Dr. W. E. Good et al., April 1981, TIS Report No. 81VDE-001, General Electric Company; "Recent Advances In the Single-Gun Television Color Light-Valve Projector," W. E. Good, Simulators & Simulation, Design, Applications, and Techniques, SPIE Vol. 59, 1975; and "A New Approach To Color Television Display and Color Selection Using a Sealed Light Valve," W. E. Good, Proceedings Of the National Electronics Conference, Vol. XXIV, 1968.

While the foregoing literature describes the construction and operation of light valves, it is important to point out for purposes of the subject invention that the intensity of the electron beam or beam current within the light valve must be maintained at a virtually constant value in order to avoid variations in the intensity of light emitted by the light valve. Any undesirable variations in the intensity of the electron beam interferes and masks the desired modulation conditions and, as suggested, such undesired variations are detrimental to the proper operation of the light valve since undesired optical intensity variations are introduced into the displayed image.

Systems for maintaining a constant intensity of the light valve electron beam have been proposed. Systems of this type are described in U.S. Pat. Nos. 3,325,592 to W. E. Good et al., issued June 13, 1967, and 3,619,717 to Lee et al., issued Nov. 9, 1971. Both of the foregoing patents have been assigned to the Assignee of the subject invention.

The Lee et al patent discloses an electron beam current regulator for a light valve which utilizes feed-back to sense the light valve beam current to control the frequency of a free-running relaxation oscillator which includes a gas-filled glow discharge tube. The glow discharge tube is utilized to discharge the charge stored on a timing capacitor. The resulting pulses at the output of the relaxation oscillator are converted to a voltage by a frequency-to-amplitude converter, the output of which is compared to a reference voltage. The output of the comparator is used to regulate the voltage at the control grid of the light valve. The Lee et al circuit has a number of disadvantages. Primarily, it relies on a neon glow discharge tube. The precise electrical characteristics of such tubes are difficult to control and their characteristics vary over the age of the tube. Since the tube characteristics are crucial in establishing the frequency of the relaxation oscillator, and regulation of the beam current relies on the frequency of oscillation, the Lee et al circuit is not sufficiently accurate and reliable. Although initial accuracy can be maximized by careful hand selection of the neon tubes, the operation of the circuit deteriorates with aging of the tube. An additional disadvantage of the Lee et al arrangement is that the use of a neon glow discharge tube limits the minimum width of the pulses because of the firing time of the neon tube. The wide pulses introduce error into the system because the time averages of the pulses are measured.

Starting in the early 1970's, the General Electric Company has used beam current regulating circuitry in its PJ5000 series video projectors which is a modification of the circuit disclosed in the Lee et al patent. The circuitry in the PJ5000 series video projectors also makes use of a neon tube. However, instead of being used to discharge a timing capacitor as in Lee et al, the neon tube in the PJ5000 circuitry charges a capacitor circuit which then provides the current to the output. Again, the inability to control the operating parameters of the neon tube and keeping those parameters constant has resulted in a wide fluctuation in tolerances particularly over the life of the neon tube. The disadvantages in using a neon tube discussed above in connection with the Lee et al patent are equally applicable to the PJ5000 circuitry.

Additionally, light valves, like numerous other active current control devices, require high voltages on the order of kilovolts. This has presented a problem in the design of current regulating circuitry which must sense and measure extremely low currents, on the order of micro-amps, at high impedance, by using low voltage control circuitry which must be adequately isolated from the sources of high voltage.

SUMMARY OF THE INVENTION

Accordingly, one object of the invention is to provide a constant current control circuit for an active current control device, such as a light valve, which does not have the disadvantages associated with prior circuits used for this purpose.

It is another object of the present invention to substantially improve the initial and over life accuracy, and reliability of constant current control circuitry particularly for light valves, over pre-existing circuits.

It is still another object of the present invention to provide a constant current control circuit which eliminates problems of instability and limited life by avoiding the use of relaxation oscillators and their active component, the neon glow discharge tube.

It is yet another object of the present invention to provide a constant current control circuit of the type suggested above which relies on charging pulses having extremely short duty cycles in relation to the pulse repetition rates thereby optimizing the accuracy of the system.

It is a further object of the present invention to provide a constant current control circuit of the type under discussion which utilizes a pulse generator which can be driven by external synchronization signals to thereby allow a wide range of charging pulse characteristics or parameters.

It is a still further object of the present invention to provide a constant current control circuit for light valves which monitors the current to be regulated by indirect sensing.

It is yet a further object of the present invention to provide a constant current control circuit which provides high voltage isolation between the high voltage supplies and the low voltage circuitry utilized to sense and regulate the current to be maintained constant.

In order to achieve the above objects, as well as others which will become apparent hereafter, the system in accordance with the present invention for maintaining a constant current in an active current control device comprises electrical storage means for storing electrical charge and forming a source of regulated current. The regulated current flows in a direction to deplete the electrical charge in said electrical storage means. Pulsing means are provided for generating periodic charging pulses and applying same to electrical storage means to restore the electrical charge depleted by the flow of said regulated current between each two successive pulses. A pulse driver means is utilized for driving said pulsing means at a preselected duty cycle and repetition rate. State of charge detecting means are provided for detecting the state of charge in said electrical storage means and generating a control signal representative of the state of charge of said electrical storage means. Monitoring means are utilized for inhibiting at least one of the active current control device and said pulse driver means upon detection of a predetermined minimum and maximum states of charge in said electrical storage means. Control means is provided which is responsive to the current flow through said electrical storage means to regulate said current and maintain it at a substantially constant predetermined level.

In accordance with a presently preferred embodiment of the invention, the electrical storage means comprises a capacitor which is periodically recharged by a flyback circuit which includes a flyback transformer that provides high voltage isolation. Sensing and control accuracy is enhanced by the use of separate capacitive circuit, substantially in parallel with the pulsed capacitor, which senses the fluctuations of charge on the pulsed capacitor and generates a substantially constant current representative of the regulated current which is, in turn, used to produce a a current-regulating control voltage, such as a grid voltage on a light valve.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF PRESENTLY PREFERRED EMBODIMENTS

Figure 1:
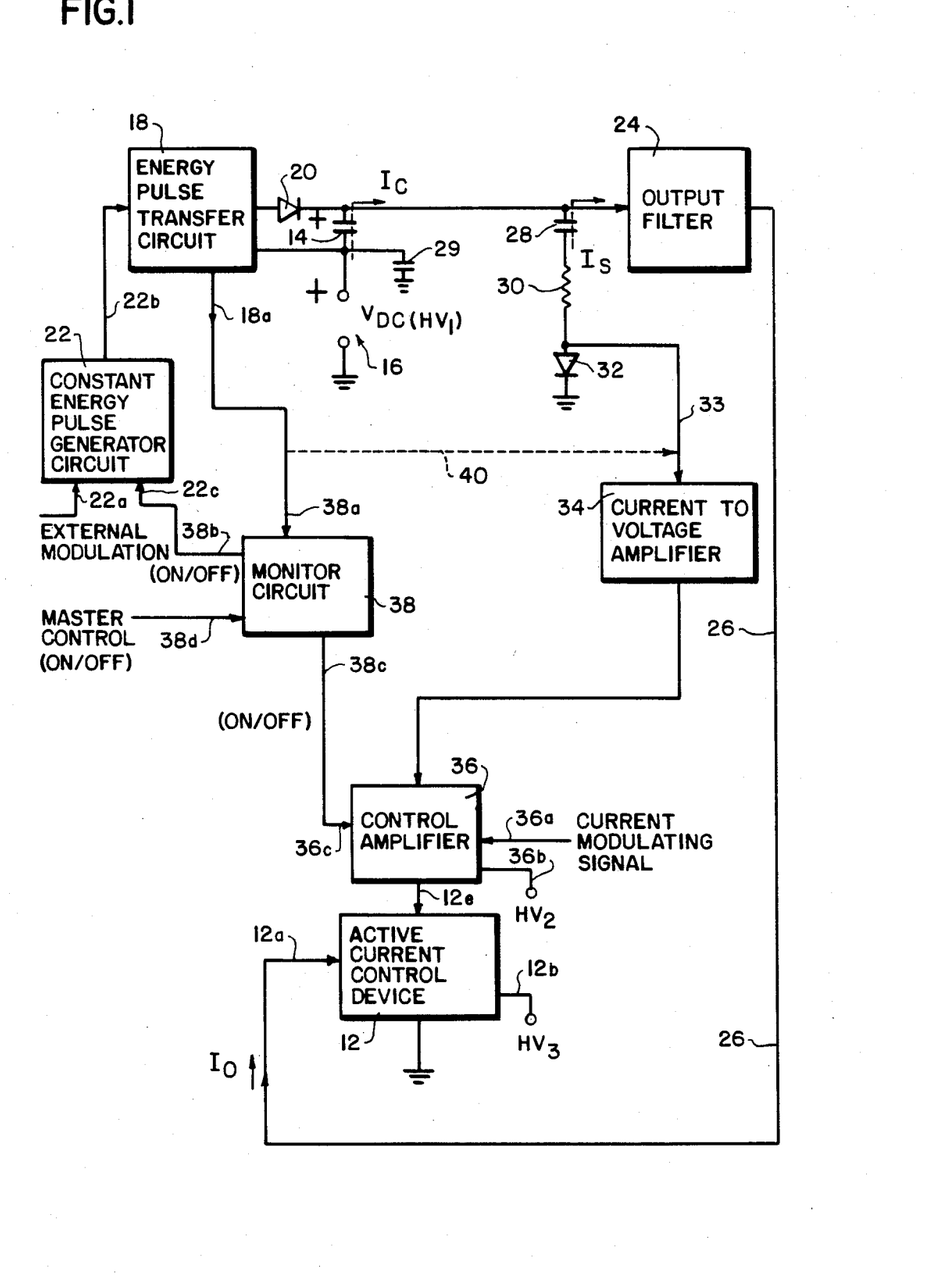
FIG. 1 is a block diagram illustrating the component elements of a generalized system in accordance with the present invention, and showing, by means of a dashed line 40, one optional variant or modification of the preferred circuit.

Referring now specifically to the Figures, in which identical or similar parts are designated by the same reference numerals throughout, and first referring to FIG. 1, the system for maintaining a constant current control.

The generalized constant current control system can be used to regulate a constant current in any active current control device, such as a beam current $I_o$ in a light valve, designated by the reference numeral 12 in FIG. 1. Although the discussion that follows will refer to a light valve as the active current control device, it will be evident to those skilled in the art that the invention can be used with any other active current control device to achieve a constant regulated current. The light valve 12 includes an input terminal 12a which is connected to a conductive thin film of a transparent disc used in the light valve which serves as an anode of the light valve through which the beam current $I_o$ to be regulated passes. The beam current, $I_o$, to be maintained constant is substantially equal to and proportional to a current $I_c$ to be regulated, as will become apparent hereafter.

An important feature of the present invention is the provision of electrical storage means, capacitor 14 in FIG. 1, for storing electrical charge and forming a source of the regulated current $I_c$. The regulated current $I_c$ flows in a direction to deplete the electrical charge in the capacitor 14. The capacitor 14 forms a relatively low voltage source of electrical potential which is in series with the anode terminal 12a.

A voltage source of high electrical potential 16 represents a DC voltage $V_{DC}$ which is in series with the potential across the capacitor 14. The voltage source 16, in the application being described, is a source of high voltage $HV_1$, although it will become apparent from the description that follows that the circuit shown in FIG. 1 can be used with any value for the voltage $V_{DC}$ when appropriately polarized components are used. With the FIG. 1 arrangement, the +0 electrode of the capacitor 14 can be shown to have, by superposition, a DC voltage component equal to the sum of the voltage across capacitor 14 and $V_{DC}$. Also, since these two first and second sources of electrical potential are in series, the same current $I_c$ will flow through both.

An energy pulse transfer circuit 18 is provided for generating periodic charging pulses and applying same to the capacitor 14 to restore the electrical charge depleted by the flow of the regulated current $I_c$ between successive pulses. The energy pulse transfer circuit 18 serves a number of functions, including DC potential isolation between the voltage source 16 and the low voltage sensing and control circuitry, as to be more fully described in connection with FIG. 2; transfers energy/charge pulses through a diode 20 to the capacitor 14; and generates a "condition signal" at the output port 18a which is representative of the state-of-charge on the capacitor 14, i.e, the voltage potential across capacitor 14. The charging pulses through the diode 20 result in a fluctuating potential in the form of a negative-going sawtooth waveform (subtractive) in relation to the DC component, as will be more fully discussed in connection with FIG. 5.

An important feature of the present invention is the use of a constant energy pulse generator circuit 22 which serves as a pulse driver circuit to control the characteristics and, therefore, duty cycle of the charging pulses issued by the energy pulse transfer circuit 18. For a specific application, the constant energy pulse generator circuit 22 is arranged to drive the energy pulse transfer circuit 18 at a preselected duty cycle and repetition rate. For extended flexibility and adjustability, an input terminal 22a is provided which can receive external modulation signals to modify the charging pulse characteristics by changing the driving pulse parameters.

An output filter 24, in the form of a low pass filter, is provided in the series loop of the anode terminal 12a and serves to attenuate high frequency spurious signals from the beam current circuit and the ripple voltage from capacitor 14.

As will be clear, the path 26 which feeds the anode through terminal 12a of the light valve 12 carries the beam current $I_o$ which is equal to the combined current $I_c$ passing through the pulsed capacitor 14 and a sensing current $I_s$ which flows through a sensing circuit to be described. However, because the sensing current $I_s$ is substantially smaller in magnitude than the regulated current $I_c$, the anode or beam current $I_o$ passing through the path 26 is substantially equal to and proportional to the regulated current $I_c$.

In the presently preferred embodiment, a state-of-charge detection circuit is provided in 18 for detecting the state of charge on the capacitor 14 and generating, at the output terminal 18a, a control or state-of-charge "condition signal" representative of the state of charge on the capacitor 14.

Figure 5:
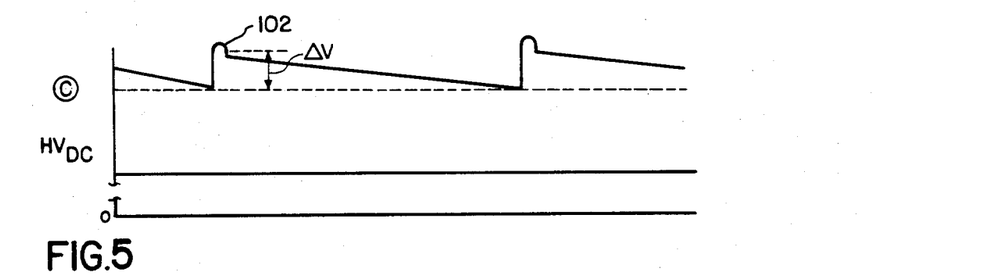
FIG. 5 is a time plot showing the state of charge or potential fluctuations across the pulsed capacitor at "C" in FIG. 2, showing the recharging of the capacitor and the gradual discharging between successive pulses.

In accordance with the presently preferred embodiment, the sensing circuit for sensing the regulated current $I_c$ flowing through the capacitor 14 includes a precision capacitor 28 which is connected substantially in "AC" parallel to the capacitor 14. The capacitor 28 is connected in series with a resistor 30 and diode 32 to ground as shown. Being substantially in parallel with the capacitor 14, the fluctuations of potential across the capacitor 14 due to periodic charging thereof, also appear across the capacitor 28. Since the potential variations, as to be more fully discussed in connection with FIG. 5, are substantially linear variations, with the exception of the abrupt transitions, the sensing current $I_s$ passing through the capacitor 28 will be substantially constant and have a magnitude which is representative of the rate at which the capacitor 14 discharges and, therefore, representative of the magnitude of the regulated current $I_c$. The resistor 30 and the diode 32 minimize extraneous current spikes or spurious signals at the junction between the resistor 30 and the diode 32 connected to the current-to-voltage amplifier 34. Capacitor 29 provides a charge flow path for the recharging of capacitor 28 simultaneously with capacitor 14.

The AC voltage components or variations, having been converted into a substantially direct current in the path 33, are detected in a current-to-voltage amplifier 34. The output of the current-to-voltage amplifier 34 provides a voltage signal proportional to the monitored supply current $I_c$ and is applied to a control amplifier 36 and, from 36 to the light valve 12 to adjust the system load to maintain a constant current drain on the high voltage supply 16. The current-to-voltage amplifier 34 and the control amplifier 36 together form a grid control circuit which is responsive to the current flow through the capacitor 14 to regulate the flow of electrons in the beam current $I_o$ and maintain it at a substantially constant predetermined level.

The precision sensing capacitor 28 and associated circuitry serves as a feedback path.

The control amplifier 36 also includes a input 36a which is adapted to receive a current modulating signal. In the application under discussion, such signal can constitute a composite blanking signal of the type used with television signals. When the beam retraces to start a new line or field, the current modulating signal can turn off the beam so that it does not write on the light valve disc.

A monitor circuit 38 is provided which has an input terminal 38a connected to the output terminal 18a of the energy pulse transfer circuit 18 for receiving the "condition signal" which is representative of the state of charge of the capacitor 14. The monitor circuit 38 has two output terminals 38b and 38c respectively connected to input terminal 22c of the constant energy pulse generator circuit 22 and the input terminal 36c of the control amplifier 36. The monitor circuit is also provided with an input terminal 38d which is connected to a master on/off control, such as an external switch.

The monitor circuit 38, operating on the "condition signal" from the energy pulse transfer circuit 18 is designed to shut down the system if the "condition signal" indicates a voltage potential across the capacitor 14 which is outside the normal designed operating range. When the "condition signal" falls below a minimum level or exceeds a maximum level, means are provided to avoid possible damage, as will be more fully described in connection with FIG. 2.

The "condition signal" at the output port 18a can itself, under certain circumstances, be utilized as a current monitoring signal. This is suggested by the dashed line 40 extending to the input of the current-to-voltage amplifier 34. When the "condition signal" is used for this purpose, the capacitor 28, resistor 30, diode 32 and path 33 can be omitted. However, the current to voltage amplifier 34 would, in that event, be changed to a voltage-to-voltage amplifier since the "condition signal" is in the nature of a potential representing the state of the charge across the capacitor 14. Correlation between the voltage potential across the capacitor 14 and the current passing through that capacitor has been demonstrated by the "condition signal", but the light valve application requires the preferred method utilizing the components 28, 30, 32 and path 33 because of the greater resulting control accuracy. However, an application where the "condition signal" could be used would result in the reduction of the number of DC voltage isolation components and, therefore, may be preferable for certain applications.

Figure 2:
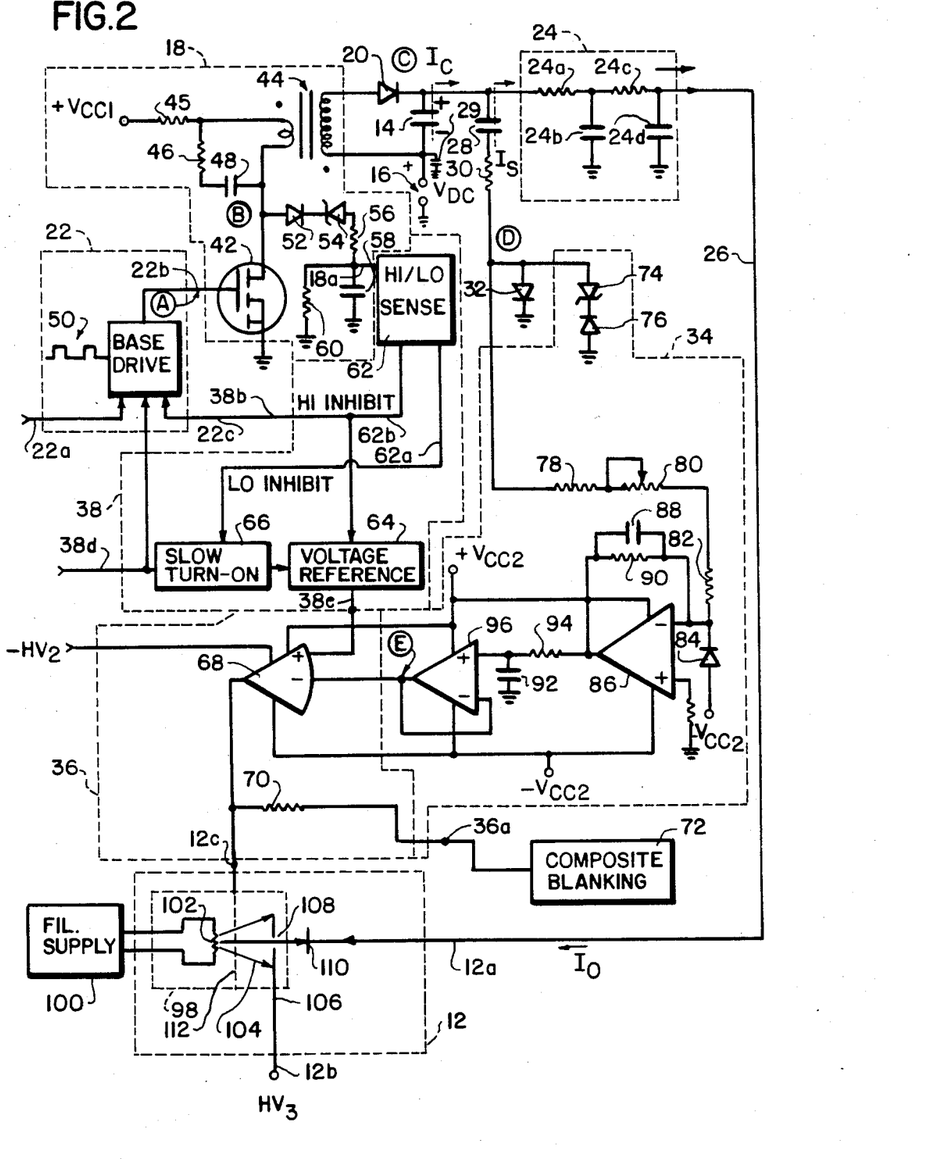
FIG. 2 is an electrical circuit schematic of a specific application of the system shown in FIG. 1, partially in block form, showing the system used to regulate the current passing through a light valve.

Referring to FIG. 2, one presently preferred realization of the system of FIG. 1 for use in conjunction with a light valve is shown. The energy pulse transfer circuit 18 includes a flyback transistor 42, the collector of which, is connected to the primary of a flyback transformer 44. A resistor 46 and capacitor 48 across the primary of the transformer 44 function to dampen the ringing of the flyback pulses on the primary winding. $V_{cc1}$ is a DC supply voltage for the flyback circuit.

The energy pulse transfer circuit 18, together with the diode 20 form a flyback arrangement for periodically recharging capacitor 14. The primary and secondary windings of the transformer 44 are isolated from each other and this further isolates the high voltage source 16 from the low voltage sensing and circuitry.

The amount of charge per pulse imparted to the capacitor 14 is selected by fixing the "on" time of the flyback transistor 42. The energy stored in the transformer 44 is a function of how long the flyback transistor is "on". The pulses 50 represent the internally generated pulse train applied by the constant energy pulse generating circuit 22 to the base of the transistor 42. In order to provide for a number of different levels of energy pulses, the "on" time between different values could be varied. This can be achieved by adjusting the component valves in a free running oscillator. Alternatively, the input terminal 22a can also receive external synchronization pulses to impart desired parameters to the charging pulses.

Diode 52 is a peak detector diode which monitors the flyback pulses at the collector of transistor 42. Zener diode 54 is provided to block $V_{cc1}$ from the capacitor 58. When the transistor 42 is OFF, and the flyback pulse has terminated, the collector or drain of the transistor 42 returns to the valve of $V_{cc1}$. For example, if $V_{cc1}$ is equal to 5 volts, Zener diode 54 can be selected to be 5.1 volts. Without the Zener diode 54, the voltage across capacitor 58 is the sum of $V_{cc1}$ (5 volts) and a voltage representative of the peak valve of the flyback pulse. Therefore, Zener diode 54 is used to remove $V_{cc1}$ from the capacitor 58. The resistor 56 is a current limiting resistor to protect the diode 52. When the flyback pulse is generated, maximum current flows through the diode 52, and the resistor 56 is intended to limit that current to a desired level. The resistor 60 is used to slowly discharge the capacitor 58. If capacitor 58 were not discharged, it would charge up to the highest peak voltage on the flyback pulse and then stay there. Thus, the resistor 60 constantly discharges the capacitor 58 at a rate so that the capacitor 58 partially discharges before the next flyback pulse comes in. In this way, on a time basis, there is some variation of the potential across the capacitor 58 and, if, for some reason, the flyback voltage goes low, the capacitor 58 can, within a short period of time, track that voltage.

A "HI/LO" sense circuit 62 is provided for sensing the potential across the capacitor 58 and issuing a "LO INHIBIT" signal on the output terminal 62a when the potential across the capacitor 58 drops below a minimum pre-set value and issuing a "HI" inihibit signal on the output terminal 62b when the potential across the capacitor 58 rises above a pre-set maximum potential. The HI/LO sense circuit 62 may comprise two operational amplifiers that are set up as comparators which compare the potential across the capacitor 58 with fixed voltage references.

If the flyback voltage gets too high, this could signify that capacitor 14 is open or the secondary of the transformer 44 is open. Under these circumstances, there is no control over the regulated beam current which then may damage the light valve. Further, if the flyback voltage gets too high, the transistor 42 can be damaged. Under those circumstances, the "HI INHIBIT" signal at the output terminal 62b is applied to the terminal 22c to inhibit the generation of further drive pulses 50 by the constant energy pulse generating circuit 22. Additionally, the "HI INHIBIT" signal is applied to a voltage reference 64 which, as will be further described below, cuts off the light valve 12.

When the potential across the capacitor 58 is below the minimum pre-set value, there is no danger to the transistor 42 and that transistor need not, therefore, be turned off. It is, however, important to shut down the light valve 12 because a low voltage across the capacitor 58 may be indicative that excess output current is being drawn. The peak value of the flyback voltage is inversely proportional to the output current so that as the current increases, the flyback voltage drops. However, since that is also a condition at start-up, the "LO INHIBIT" signal is not applied to the transistor 42 since it is possible that a normal start-up condition may be detected and the potential across the capacitor 58 must build-up to its normal level. Although the light valve 12 is cut-off under that condition, the transistor 42 continues to be driven.

When the circuit is initially turned-on, and pulses 50 are applied to the transistor 42, the light valve 12 must remain off until the voltage on the capacitor 58 at least exceeds the minimum pre-selected or threshold value. When that threshold has been passed, the "LO INHIBIT" signal is removed from the slow turn-on circuit 66. The primary purpose of the slow turn-on circuit is to compensate for the inherently slow time response of the circuit on initial turn-on. Because a number of flyback pulses are required to charge-up the capacitor 14, it is important to avoid turn-on of the light valve until the feed-back circuit, including the capacitor 58, has been stabilized at the desired level. Since full turn-on of the light valve may result in a damagingly high beam current, the slow turn-on circuit 66 insures that turn-on is slower than the feed-back circuit response time. In this way, the circuit is always controlling and tracking the beam and regulated currents without causing damage to the light valve.

The control amplifier 36 includes a differential amplifier 68, the output of which is connected to the input control terminal 12c of the light valve 12. A source of high negative voltage $HV_2$ is connected to the differential amplifier, as are suitable biasing sources $+V_{cc2}$ and $-V_{cc2}$. The voltage reference 64 is connected to the positive differential input of the amplifier 68, while the output of the current-to-voltage amplifier 34 is connected to the negative differential input. The differential amplifier 68 compares the output of the current-to-voltage amplifier 34 with the reference voltage 64 to control the high negative voltage $HV_2$ applied to the grid 112 of the light valve 12.

Also connected to the control grid 112, through a resistor 70, is a composite blanking circuit 72 for generating blanking signals of the type used in television composite signals. The application of a blanking signal to the control grid 112 blanks the beam when the beam flys back to start a new line or field so that the beam does not write on the disc or the light valve.

Zener diode 74 and diode 76 are provided to protect the current-to-voltage amplifier 34. The sensing current $I_s$ flows through resistor 78, adjustable resistor 80 and resistor 82 which is connected to $-V_{cc2}$ through diode 84. The junction between the resistor 82 and the diode 84 is connected to the negative input of operational amplifier 86. The Zener diode 74 and the diode 76 are provided to protect the input to the operational amplifier 86 and prevent large voltage spikes or spurious signals from appearing at the input to the operational amplifier and possibly damaging it. Should the voltage at the junction between the resistor 30 and the diode 32 increase to too high a level, even with the resistors 78-82, the operational amplifier 86 can nevertheless be damaged. Thus, the Zener diode 74 and diode 76 are provided to protect the low voltage circuitry. The operational amplifier 86, configured with the capacitor 88 and resistor 90 as shown forms an integrating current-to-voltage amplifier which converts the current variations in $I_s$ to voltage fluctuations the high frequencies of which are still further filtered by the resistor 94 and capacitor 92. The operational amplifier 96 is optional and forms a buffer amplifier which isolates the operational amplifier 86 from the differential amplifier 68.

The light valve gun 98 is schematically shown in FIG. 2 within a sealed enclosure defining the light valve 12. A filament supply 100 powers a filament 102 within the enclosure. The lines 104 represent the beam of current emitted by the filament 102 which is accelerated towards the first anode 106 connected to a high voltage source $HV_3$. The anode 106 has a fine aperture 108 through which a small portion of the electron beam passes to be collected on the second anode 110 representing the transparent disc. The disc has an extremely thin conducting coating on a glass substrate. As taught in the prior art references, light valve action is achieved by use of a control layer of a deformable fluid which is modulated by charge distribution from the electron beam. Excessive beam current could damage this fluid and the disc electrode in the light valve.

Figure 3:
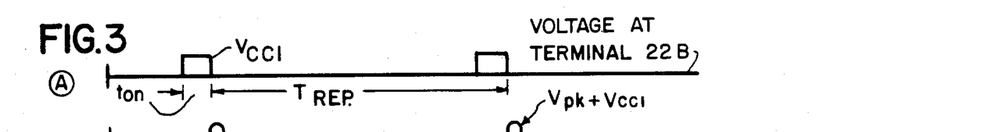
FIG. 3 is a time plot of the drive pulses at "A" in FIG. 2, applied to the base of the transistor 42 at terminal 22b.

The operation of the circuit shown in FIG. 2 will now be described. The operation is initiated by application of a suitable control signal to the input terminal 38(d) of the monitor circuit 38. This signal turns on circuit 22. The base drive pulses, FIG. 3, applied to terminal 22B of the transistor 42 turns on the transistor 42 for a fixed period of time ($T_{on}$ in FIG. 3) at a fixed repetition rate $T_{rep}$. The repetition rate can also be controlled by an external drive sync control signal applied to the input terminal 22a as suggested above.

During the conduction time of the transistor 42, the current flow will increase in the primary winding of the flyback transformer 44 at a rate and to a final value, at the end of $T_{on}$, determined by the selection of $V_{cc1}$, the primary inductance of the transformer 44, the values of the resistor 46 and capacitor 48 and the total resistance in the primary circuit, including resistor 45.

At the end of $T_{on}$, the energy stored in the core of the flyback transformer 42 will be transferred through the diode 20 to the capacitor 14. With each successive flyback pulse, the voltage across the capacitor 14 will rise resulting in an increasing peak value of the flyback pulse. The peak value of the flyback pulse, as reflected back into the primary, is detected by the detector circuitry 52, 54, 56, 58 and 60, with the capacitor 58 charging up to a potential which is a function of amplitude of the flyback pulses. When the absolute voltage across the capacitor 14 is large enough to support normal operation of the circuit, the voltage across the capacitor 58 will be above the "LO" limit of the "HI/LO" sense circuit 62 which will enable the slow start circuit 66 to turn on the voltage reference signal 64. The voltage reference signal is compared with the current sense output voltage of the operational amplifier 96 to vary the potential on the control grid 112 of the electron gun 98. The potential on the control grid 112 regulates the beam current $I_o$. As suggested above, the slow start circuit 66 allows the regulated current to rise slowly to its operating point within the time response of the closed feed-back loop. The current to be regulated $I_c$ travels through the voltage source, 16 and the capacitor 14 and through the low pass filter 24 to the filament 100 of the electron gun 98, and through the common grounds to the filament and high voltage power supplies back to the voltage source 16. As the current to be regulated passes through the capacitor 14, the voltage across the capacitor 14 decreases and is replenished by the flyback pulses which increase the voltage across the capacitor 14 by driving current pulses into the capacitor 14 in a direction opposite to the current flow to be regulated. As long as the instantaneous voltage across the capacitor 14 is of the polarity shown and of sufficient magnitude, the diode 20 is always reversed biased between flyback pulses and the circuit is in control of the current to be regulated. The range of current to be regulated, value of the capacitor 14, the amount of charge (current) delivered during the flyback pulse, and the repetition rate of the flyback time determines that condition.

For example, if the flyback transformer is a 1:5 step up transformer, to have a 300 volt pulse across the secondary, a 60 volt pulse will have to be applied across the primary. The peak value of that flyback pulse will be determined by the final value of charge on the capacitor 14 after it is finished charging up through the diode 20 at the end of the flyback pulse. Thus, if one microamp is being drawn, the peak voltage across the capacitor 14 might be 300 volts right after the flyback pulse. However, if 5 microamps were being drawn, the peak voltage across the capacitor 14 might be only 200 volts after the flyback pulse. However, because of the step up ratio going from the primary to the secondary, the magnitude of the primary pulses are indicative of the secondary charge up pulses when reflected back into the primary. For example, when one microamp is being drawn, and the peak voltage across capacitor 14 is 300 volts, the flyback pulse will be about 60 volts.

Figure 4:
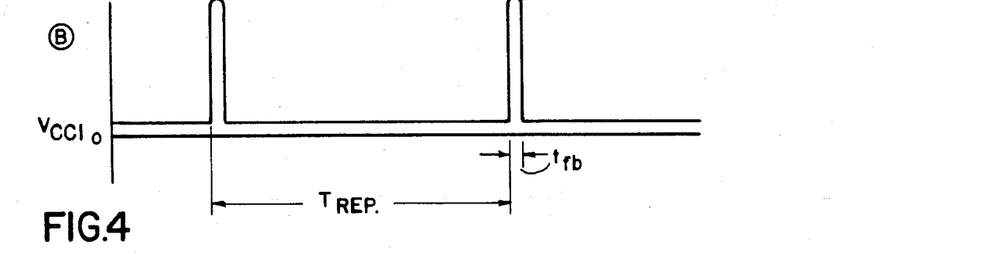
FIG. 4 is a time plot of the flyback pulses appearing at "B" in FIG. 2.

Since the capacitor 28 is effectively in parallel with the capacitor 14, with regard to AC signals, the voltage ripple across the capacitor 14 (charge and discharge) is reflected and appears across the capacitor 28. FIG. 4 illustrates the flyback pulses at the primary winding (waveform "B") which appears at the collector of the transistor 42. The absolute peak of values of the pulses will be equal to the sum of the peak voltage of the flyback pulses superimposed on the low voltage supply $V_{cc1}$. As will also be noted from FIG. 4, the flyback period $t_{fb}$ is substantially less than the repetition period $T_{rep}$. The voltage ripple across the capacitor 14 is represented by waveform "C" which is shown in FIG. 5.

As will be noted, the potential across the capacitor 14 is a superposition of the ripple voltage on the potential of the voltage source 16 $V_{DC}=HV_1$. The fluctuations are in the nature of a sawtooth waveform made up of negative-going ramps between successive charging flyback pulses and shown to fluctuate $\Delta V$ volts. An upward transition recovers the waveform to its peak upon the application of a charging pulse, the small peak 102 in FIG. 5 results from the forward recovery time of the diode 20 and the forward voltage drop across the diode.

Figure 6:
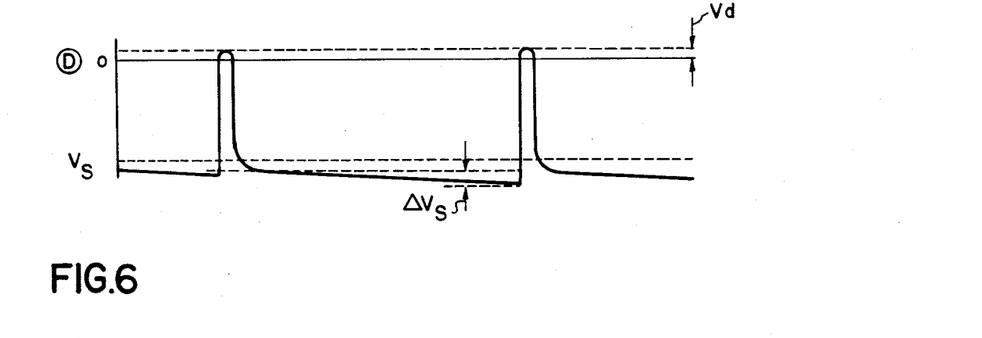
FIG. 6 is a time plot showing the voltage fluctuations in the sensing circuit at "D" in FIG. 2.

The voltage ripple across the sensing capacitor 28 is, therefore, also an AC voltage similar to that across capacitor 14. Since the voltage fluctuations, except for the transitions, are in the nature of linearly decreasing voltages, the current through the capacitor 28 is substantially a constant current, the magnitude of which is a function of the slope of the voltage variations or the rate at which the capacitor 14 discharges. The rate at which the capacitor discharges is, of course, a function of the magnitude of the current being regulated, $I_c$. It will be seen, therefore, that the capacitor 28 forms part of a sensing or feedback circuit, the sensing current of which $I_s$ is a function of the magnitude of the current being regulated, $I_c$. The diode 32, as noted, shunts to ground, current spikes due to the flyback pulses. FIG. 6 illustrates waveform "D" which is the waveform appearing at the junction between the resistor 30 and diode 32, the waveform which is applied to the current-to-voltage amplifier 34, where $V_d$ represents the forward voltage drop across diode 32 and $\Delta V_s$ represents the voltage variation due to the flow of the sense current $I_s$ through the capacitor 28.

An important feature of the present invention which improves the reliability of the circuit, is the use of a flyback repetition time which is much longer than the flyback pulse width. Thus, if the repetition rate is one millisecond, the pulse width may be selected to be on the order of 2-3 microseconds. The operational amplifier 86 operates as an integrating current-to-voltage converter, the integrating function of the amplifier 86 averaging out the current transients in the sense current $I_s$ due to the flyback pulses and voltage ripple due to the current $I_s$ passing through the capacitor 28. As noted, the resistor 94 and capacitor 92 provide additional filtering for that current ripple.

Figure 7:
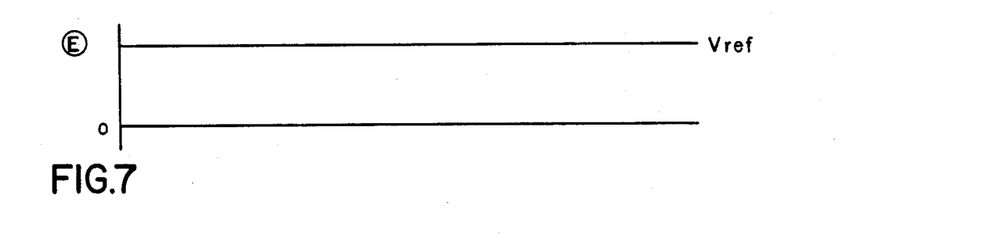
FIG. 7 is a time plot of the output of the current to voltage amplifier at "E" in FIG. 2, showing same to be equal during normal operation to the reference voltage applied by the monitor circuit.

The voltage output of the operational amplifier 96 (voltage follower) is directly proportional to the regulated current. The differential amplifier 68 provides an output voltage to the grid 112 of the electron gun 98 to control the electron beam (regulated current) $I_o$ such that the output voltage at the negative differential input of the differential amplifier 68 is always equal to the voltage reference 64, this providing a regulated current (waveform "E" in FIG. 7).

In the specific application shown in FIG. 2, an additional modulating signal to the current called "composite blanking" is provided which is summed with the output of the differential amplifier 68 through the resistor 70.

As suggested, the peak value of the flyback voltage varies as a function of the current $I_c$ through the capacitor 14. Since the "condition signal" at the output terminal 18a of the energy pulse transfer circuit (either the voltage at the collector of the transistor 42 or the voltage potential across the capacitor 58) contains information regarding the regulated current $I_c$, the "condition signal" was investigated as a possible current monitoring signal. Correlation between the voltage potential across the capacitor 14 and the current passing through the capacitor 14 was demonstrated by this "condition signal," but the variation did not allow as accurate a control as when the sensing or feedback circuitry including the capacitor 28 is used. Existing circuitry provides approximately 5 to 10% error, while the circuitry utilizing the sensing capacitor 28 provided better than 1% control of the constant current $I_c$. Using the "condition signal" as the error signal source might provide an intermediate margin of error of approximately 3%. For use with a light valve, the circuit requiring the capacitor 28 was required for its greater control accuracy. However, in certain applications which can tolerate somewhat less control accuracy, use can be made of the "condition signal" as an error signal to be sent to the current-to-voltage amplifier 34, as suggested by the dashed line 40 in FIG. 1. Under those circumstances, of course, certain components including the elements 28, 30, 32 and 33 could be omitted. The current-to-voltage amplifier would, in that event, also be changed to simply a voltage amplifier since the "condition signal" is in the nature of a voltage representative of the state of charge on the capacitor 14. Additionally, an application where the "condition signal" could be used would result in the reduction of the number of DC voltage isolation components.

One of the design concepts utilized in the implementation of the subject invention is that it is easier to control the current output of a low voltage power supply accurately and reliably than to do so for a high voltage power supply. It is even more difficult when the power supply whose current output is to be controlled, must be a high DC voltage supply, isolated from the low voltage control circuitry. By placing a low voltage power supply (capacitor 14) in series with a high voltage power supply 16 ($V_{DC}$), the same current to be regulated $I_c$ passes through both. Controlling the current through the low voltage supply inherently controls the current through the high voltage supply as well.

According to the broader aspects of the present invention, the charging pulses have parameters which are a function of the state of charge on the capacitor 14 and the value of the regulated current passing through the capacitor 14. The pulse parameters may include, for example, the amplitude, pulse width, duty cycle, and frequency. The control or "condition" signal is a function of the charging pulse parameters. Since the "condition" signal is a function of both the charge or potential across the capacitor 14 and the current flowing through that capacitor, the charging pulses are a function of the effective impedance of the capacitor 14 as reflected back to the energy pulse transfer circuit 18. In the specific embodiment shown in FIG. 2, the amplitude of the flyback pulses are a function of the impedance of the capacitor 14 as reflected through the flyback transformer 44. It is the detection of the changes in the parameters which provides a "condition" signal which is representative of the state of charge on capacitor 14 and the regulated current passing therethrough.

While the invention is described with reference to the specific embodiment thereof with respect to the incorporation therein of certain combinations of features, it is to be understood that the invention may be embodied in other forms, many of which do not incorporate all of the features in the specific embodiment of this invention which has been described. The invention may be used to regulate the current to any active current control device, whether such device is a light valve, transistor, or any load requiring a constant current. Additionally, as discussed in connection with the optional path 40 shown in FIG. 1, the "condition signal" can be used directly as an error signal, although the use of the precision sensing capacitor 28 is the preferred approach for the specific application for regulating a current to a light valve.

Another possible modification involves the use of a forward converter in place of a flyback circuit of the type discussed in connection with FIG. 2. The use of a forward converter would involve the monitoring of the energy required to charge up the capacitor 14 to a fixed value. Thus, the peak value across the capacitor 14 would always be returned to its initial fixed valve regardless of what current was being drawn. When the transistor 42 turns on to charge the capacitor 14, the amount of charge required to force capacitor 14 to its initial fixed value would be measured, the energy per charge pulse would be monitored to determine what the regulated current is. With this approach, therefore, the current in the primary is monitored when the transistor 42 is turned on. The use of a forward converter would require some modifications to the circuitry shown in FIG. 2, such as the reversal of the phasing of the transformer 14 and other changes required for a given application which would be evident to those skilled in the art.

What is claimed is:

1. A system for maintaining a constant current in an active current control device, said system comprising:
    electrical storage means including a capacitor for storing electrical charge and forming a source of regulated current in a direction to deplete the electrical charge therein;
    pulsing means for generating periodic charging pulses and applying same to said electrical storage means to restore the electrical charge depleted by the flow of said regulated current between successive pulses;
    pulse driver means for driving said pulsing means at a preselected duty cycle and repetition rate;
    state of charge detecting means for detecting the state of charge in said electrical storage means and generating a control signal representative of the state of charge of said electrical storage means;
    monitoring means for inhibiting the active current control device and/or said pulse driver means upon detection of predetermined minimum and maximum states of charge in said electrical storage means; and
    Control means for responding to the current through said electrical storage means to regulate said current and maintain it at a substantially constant predetermined level.

2. A system as defined in claim 1, wherein said electrical storage means comprises a first source of electrical potential, and further comprising a second source of electrical potential arranged in series with said electrical storage means, whereby said regulated current flows through both said electrical storage means and said second source of electrical potential.

3. A system as defined in claim 2, wherein the active current control device is a light valve and the light valve has a disc forming an electrode of the light valve, and said second source of electrical potential comprises a high voltage source applied to said electrode in series with the potential across said electrical storage means.

4. A system as defined in claim 1, wherein said pulsing means comprises flyback circuit means coupled to said electrical storage means.

5. A system as defined in claim 1, wherein said pulse driver means includes sync input means for receiving external synchronization pulses to said pulse driver means for externally controlling the switching parameters of the charging pulses.

6. A system as defined in claim 1, wherein said pulsing means comprises flyback circuit means coupled to said electrical storage means, and wherein said state-of-charge detecting means comprises detector circuit means for detecting the peak values of the flyback pulses and generating said control signal.

7. A system as defined in claim 1, wherein said monitoring means includes comparator means for receiving said control signal and generating a first inhibit signal when said control signal falls below a predetermined low level and a second inhibit signal when said control signal exceeds a predetermined high level.

8. A system as defined in claim 7, wherein said pulse driver means has an enable input means for receiving an enable signal, and said monitoring means further including slow turn-on circuit means responsive to said comparator means for generating said enable signal only in the absence of said second inhibit signal.

9. A system as defined in claim 7, wherein said control means include signal input means for receiving an inhibit signal responsive to the generation of at least one of said first and second inhibit signals, said control means including circuit means for turning off the active current control device when an inhibit signal is received by said control means.

10. A system as defined in claim 1, wherein said control means comprises amplifier means for generating a control voltage responsive to the magnitude of said control signal.

11. A system as defined in claim 1, wherein said control means comprises sensing circuit means for sensing said regulated current flowing through said electrical storage means and generating a monitored current signal representative of said regulated current, and amplifier means for generating a control voltage responsive to the magnitude of said monitored current signal.

12. A system as defined in claim 11, wherein said sensing circuit means comprises capacitive circuit means for monitoring the fluctuations of charge on said electrical storage means and generating a substantially constant current representative of the magnitude of said regulated current and defining said monitored current signal.

13. A system as defined in claim 12, wherein said capacitive circuit means is connected substantially in parallel to said electrical storage means.

14. A system as defined in claim 12, wherein said capacitive circuit means further comprises spike suppression means associated with said precision capacitor to minimize current spikes inputed to said amplifier means.

15. A system as defined in claim 1, wherein the active current control device is a light valve, and wherein said control means comprises a control grid electrode which controls the flow of the electron beam in the light valve, said beam curent being substantially equal to said regulated current.

16. A method of maintaining a constant current in an active current control device comprising the steps of:
    storing electrical charge on electrical storage means including a capacitor and forming a source of regulated current in a direction to deplete the electrical charge therein;
    generating periodic charging pulses with pulsing means and applying same to said electrical storage means to restore the electrical charge depleted by the flow of said regulated current between successive pulses;
    driving said pulsing means with pulse driver means at a preselected duty cycle and repetition rate;
    detecting the state of charge in said electrical storage means and generating a control signal representative of the state of charge of said electrical storage means;
    inhibiting the active current control device and/or said pulse driver means upon detection of predetermined minimum and maximum states of charge in said electrical storage means; and responding to the current through said electrical storage means to regulate said current and maintain it at a substantially constant predetermined level.

17. A method as defined in claim 16, wherein the source of regulated current comprises a first power supply, and further comprising the step of placing a second power supply in series with the first power supply so that the regulated current passing through the first power supply also passes through the second power supply, whereby regulation of the current passing through the first power supplies also regulates the current through the second power supply.

18. A method as defined in claim 16, wherein said regulated current is a DC current, and wherein a capacitor is used to store said electrical charge and form said source of a regulated current, whereby a capacitor is used in series with a regulated DC current.

19. A method as defined in claim 18, wherein said step of detecting the state of charge comprises the steps of generating flyback pulses; applying said flyback pulses through a flyback transformer to the capacitor, the amplitude of the flyback pulses being a function of the impedance of the capacitor reflected through the flyback transformer, which impedance is a function of the regulated current passing through the capacitor; and detecting the flyback pulses to provide a signal representative of the state-of-charge.

20. A method as defined in claim 16, wherein the step of generating and applying said charging pulses comprises generating and applying charging pulses having parameters which are a function of the state of charge on said electrical storage means and the value of the regulated current passing through said storage means; and said step of generating a control signal comprises generating a control signal which is a function of said parameters of said charging pulses.

* * * * *